No. 688,187. Patented Dec. 3, 1901.
A. D. MADDOX.
SINGLETREE AND HORSE DETACHER.
(Application filed Sept. 28, 1901.)
(No Model.)

Witnesses,
L. Chieser.
Myra B. Webb.

Inventor,
Albert D. Maddox.
By A. W. Willedus
Attorneys

UNITED STATES PATENT OFFICE.

ALBERT D. MADDOX, OF HOLLADAY, TENNESSEE.

SINGLETREE AND HORSE-DETACHER.

SPECIFICATION forming part of Letters Patent No. 688,187, dated December 3, 1901.

Application filed September 28, 1901. Serial No. 76,885. (No model.)

*To all whom it may concern:*

Be it known that I, ALBERT D. MADDOX, a citizen of the United States, residing at Holladay, in the county of Benton and State of Tennessee, have invented new and useful Improvements in Singletrees and Horse - Detachers, of which the following is a specification.

This invention relates to singletrees and horse-detachers, being a combination of a singletree with horse-detaching devices; and it consists in certain improvements in the construction of such devices, as hereinafter described and claimed.

Figure 1:
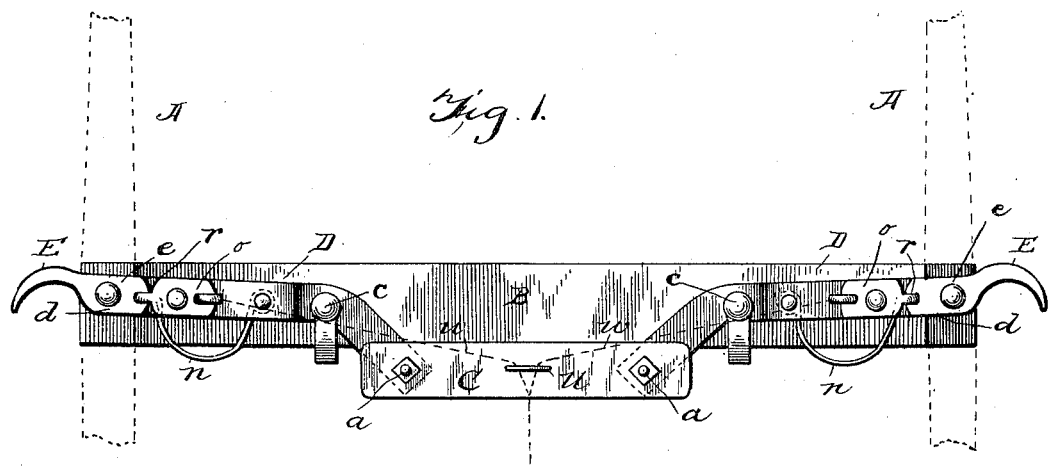
Figure 2:
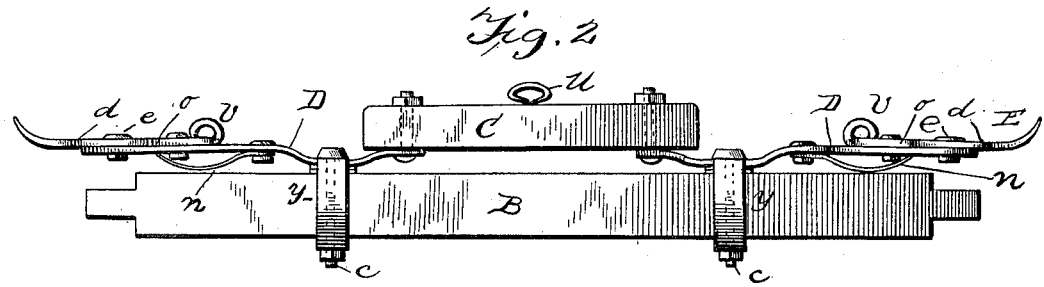
Figure 3:
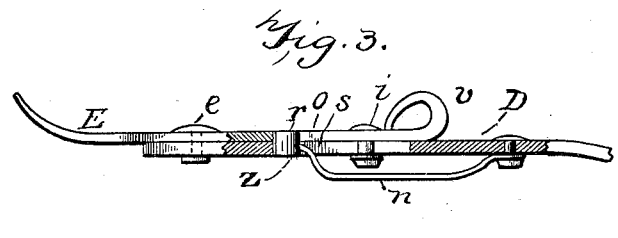
Figure 4:
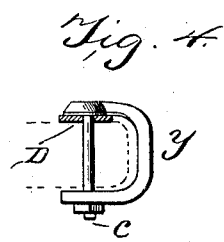

In the accompanying drawings, Figure 1 represents a plan view showing my improved singletree and detacher in connection with the shafts of a vehicle. Fig. 2 is a rear view of the same. Fig. 3 is a detail view of a hook and its connections. Fig. 4 represents one of the croffs or clips employed to secure certain parts of the singletree to the cross-bar to which the shafts are secured.

A designates the vehicle-shafts, which are connected by a cross-bar B, the ends of which are secured to said shafts. The singletree is formed of a bar C and two crooked bars D, each of the latter having its inward end pivotally connected with one end of the bar C by a bolt $a$. As will be seen, the bar C is supported in position by the bars D somewhat above the plane of the cross-bar B and rearward from the center line of the latter. The bars D, extending diagonally from their pivotal connections with the bar C, are bent a short distance from the latter and extend outward in opposite directions and are also pivotally connected with the cross-bar B by bolts $c$.

E indicates the hooks for connecting the traces with the singletree, said hooks extending from or being made solid with the plates $d$, which are pivotally secured to the bars D at $e$. These plates $d$ are each formed with a recess or opening in their inward ends to receive the tongues $r$ of the slides $o$, one of which is movably secured to each of the bars D by means of a bolt $i$ passed through a slot $s$ in said bar.

The slides $o$ are provided with springs $n$ to project them and lock the hooks E in position, and each slide has an eye $v$, to which one end of a cord $w$ (indicated in broken lines in Fig. 1) may be attached, said cord being passed through a loop $u$, secured to the bar C, so as to be pulled by the driver when it is desired to detach the horse from the vehicle.

For the purposes of a singletree the hooks E are kept locked by the slides $o$ and springs $n$, the movements of the bars C and D being governed by the pivotal connections of the bars D with the bar C and with the cross-bar B. Each of the slides $o$ has a stud or projection $z$, which extends into a slot $s$ in a bar D. The clips $y$ serve to brace the bars D and hold them to the cross-bar B. With the singletree thus constructed with its pivotal connections with the bar C and with cross-bar B the devices, including the cross-bar and the shaft-irons, are much less liable to breakage at any point, the strain on the parts being distributed along the line of the cross-bar B. The singletree makes a take-up movement corresponding with any irregular movement of the horse or vehicle, and the horse is not struck by the shaft's wagging when a wheel sinks into a depression or rut, the traces serving to draw it out.

When it is desired to detach a horse from the vehicle, the driver draws the cord $w$, which draws inward the slides $o$ and releases the hooks E, and the plates $d$, turning on their pivots, the traces slip from the hooks E.

Wood or metal, or both, may be used in making the device.

What I claim, and desire to secure by Letters Patent, is—

1. The combination with a cross-bar of the shafts of a vehicle of a centrally-mounted bar and two other bars extending in opposite directions and having hooks on their outward extremities, each of said two bars having a pivotal connection with the said cross-bar and also a pivotal connection at its inward end with said centrally-mounted bar, substantially as and for the purposes described.

2. The combination with a cross-bar of the shafts of a vehicle, of a centrally-mounted bar, two other bars pivotally connected at their inward ends with said centrally-mounted bar and also having pivotal connections with said cross-bar, hooks formed on plates, one of which is pivotally connected with each of said two bars at its outer end, sliding plates, movably secured to bars and provided with springs, said sliding plates being adapted to lock or release said hooks, substantially as set forth and described.

3. The combination with a cross-bar of the shafts of a vehicle, of a bar C, two bars D, pivotally connected with said cross-bar and also pivotally connected with the bar C, trace-hooks, formed with notched plates, pivotally connected with bars D, slides $o$, movably mounted on the bars D, springs to actuate said slides and lock said hooks, and a draw-cord connected with said slides whereby the latter may be withdrawn and said hooks released.

In testimony whereof I affix my signature in presence of two witnesses.

ALBERT D. MADDOX.

Witnesses:
H. C. ALLEN,
J. A. SPENCE.